March 22, 1966    A. T. DILDILIAN ET AL    3,242,033

GLASS FIBER MAT

Filed Feb. 21, 1962

United States Patent Office 3,242,033
Patented Mar. 22, 1966

3,242,033
GLASS FIBER MAT
Ara T. Dildilian, Broadalbin, and Edward W. Nicholas, Rotterdam Junction, N.Y., assignors to Fiber Glass Industries, Inc., Amsterdam, N.Y., a corporation of New York
Filed Feb. 21, 1962, Ser. No. 174,854
2 Claims. (Cl. 161—72)

The present invention relates to a bat or mat of glass fiber filaments suitable for use in reinforcing molded plastic material.

Glass fiber material in the form of a mat or bat has come into wide use as a reinforcing material for molded synthetic organic resinous materials. Such mats in the past have in most cases been formed of short chopped lengths or bundles of glass filaments, each bundle comprising a large number of individual filaments, the filaments being secured together during the glass manufacture by a sizing or adhesive. Such chopped bundles have been formed into mats by depositing the bundles into a bat of desired width and thickness and bonding the chopped strands together either by the use of an adhesive or by fiber glass filaments disposed transversely of the mat by a needling operation.

While such mats have enjoyed wide use, they are not entirely free from undesirable qualities, which have limited their use. Lack of uniformity of distribution of the fiber within the mat always has been a problem, as it is difficult or impossible to deposit the chopped fibers in a uniform distribution when forming the mat. When an adhesive is used to secure the chopped bundles together in mat form, the nature of the adhesive limits the choice of resin systems by the fabricator who employs the mats in the manufacture of molded articles. The mats are weak, whether the bundles are secured together by adhesive or mechanically, and cannot be treated or saturated with resins on continuous process equipment without the use of carriers or conveyors, as the mats when saturated with resin will not support their own weight and will fall apart. In addition, both forms of mats are expensive.

An object of the invention is to provide an improved glass fiber mat or bat, for use in the reinforcement of molded plastic materials, of improved strength and other physical characteristics.

A further object of the invention is to provide such a mat which may be formed from glass fiber at less expense than mats heretofore available.

A further object is to provide such a mat having an enhanced uniformity of distribution of glass fiber throughout the mat.

A further object is to provide a mat of this character which shows unidirectional strength, whereby it can be pre-impregnated with the resin and handled through driers and other process equipment without the necessity for being supported on a carrier or conveyor.

A further object is to provide such a mat of improved compressibility and which will provide improved uniformity of distribution of the resin throughout the final molded object.

Other objects, features and advantages of the invention will become apparent from the following description of a presently preferred embodiment thereof selected for purposes of illustration of the invention, in which description reference is made to the accompanying drawing wherein.

In accordance with the invention we form a mat which is highly drapable, conformable, and compressible by associating in the form of a sheet a plurality of rovings of a special form, each roving containing a multiplicity of adhesively joined individual glass fiber filaments, the rovings being associated together to form a mat having sufficient coherence and integrity to be self-sustaining when handled without the use of adhesive bonds between the individual rovings but solely by filaments from the rovings displaced transversely of the mat by a needling operation.

Figure 6:
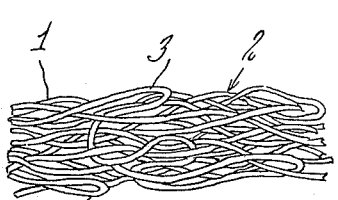
FIG. 6 is an enlarged view in elevation of a roving employed in the invention.

In accordance with the invention we employ a roving 2 (FIG. 6) of a special form comprising a strand 1 composed of a multiplicity of individual glass fiber filaments. The strand is repeatedly doubled up upon itself at every point along the length of the roving 2, some of the doublings being intertwined with and crossing over other doublings of the strand, and doublings being staggered longitudinally of the strand. A cross-section of the roving at any point reveals a number of portions of the strand lying in generally parallel relationship with each other to provide a plurality of strand portions at each point along the roving. The roving is formed by slowing down the lineal rate of movement of a continuously produced strand (comprising a multiplicity of filaments adhesively secured together side by side) by repeatedly and periodically interrupting the linear movement of the strand to form successive "doublings" of the strand, and progressively associating the "doublings" to increase the number of portions of the strand which are laterally associated at every point along the roving. The roving thus comprises a plurality of overlapped loops 3 gathered together to form the roving. A single roving may include a plurality of continuous separate strands, and the roving may be twisted. Roving of this character is disclosed in more detail in the Slater and Drummond Patent Nos. 2,719,350 and 2,719,352. For convenience, such roving is referred to herein as "staggered looped roving."

Referring to the drawing, the mat is formed by feeding a large number of such staggered looped rovings 2 from a number of separate spools 4, on to a moving conveyor 8. Instead of separate spools, a single beam may be employed. The conveyor is provided with an endless apron 6 which passes about a pair of guide rollers 10 and 12. As they move forwardly with the upper flight of the apron 6, the rovings 2 are brought into general parallel relationship, lying side by side and to some extent disposed more than one layer in depth. A web of light weight woven textile material 14, such as cheesecloth, is fed from a roll 16 on to the conveyor 8 beneath the rovings 2. From the conveyor 8 the associated group of rovings passes across the upper side of a stationary table 18 and into a needling apparatus 20 of a conventional kind. The needling apparatus comprises a plurality of barbed needles 22 carried in a head or needleboard 24 which is adapted to be vertically reciprocated so as to project the needles downwardly into and through the mass of rovings 2 and the textile web 14, as they pass together through the needling apparatus. Perforated upper and lower guide plates 26 and 28, forming part of the needling apparatus, support and maintain the rovings in sheet form as the needles 22 are inserted and withdrawn.

The effect of the needling operation is to displace many of the fibers or individual filaments 30 of the rovings from the plane of the sheet or mat and cause them to be disposed transversely of the mat. As appears at 32, in FIG. 4, certain of the displaced filaments extend through the woven backing fabric 14, whereby the backing fabric is secured to the mass of rovings 2 as an integral part of the mat.

The needled assembly of backing fabric and rovings passes from the needling apparatus 20 through a pair of feed rollers 34, 36 which are driven to draw the web and rovings from the supply spools 4 and 15 and through the needling apparatus. From the roll pair 34, 36 the completed mat 38 passes downwardly to a roll 40 on which it is wound up for subsequent storage and shipment.

For some purposes a more suitable product is obtained by the use in place of the web of woven textile material 14 of a surfacing web comprising a non-woven fabric. Such nonwoven fabric may be, for example, a layer of glass fibers adhesively bonded into a coherent, self-sustaining web which is thin as compared with the main body of the mat. When a nonwoven web is employed it is drawn from the supply roll 16 and handled in the same manner as the web 14.

Figure 1:
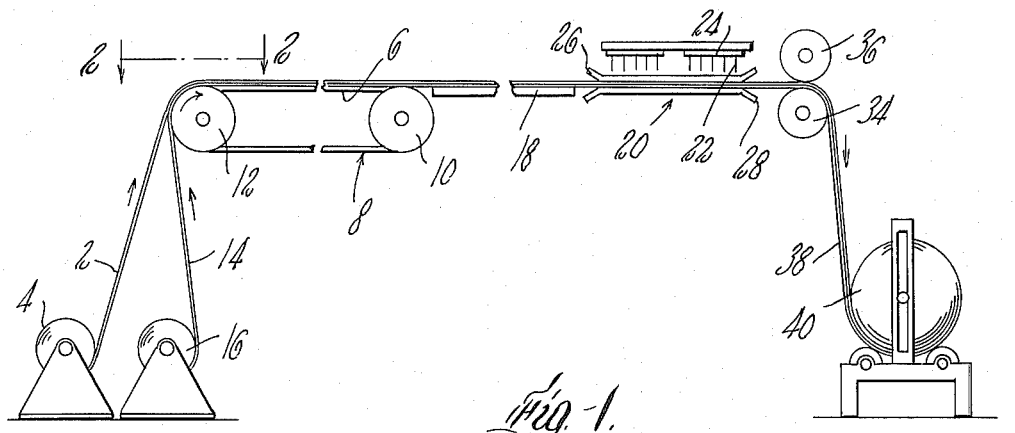
FIG. 1 is an elevation, somewhat schematic, of an apparatus by use of which the mat may be manufactured.
Figure 2:
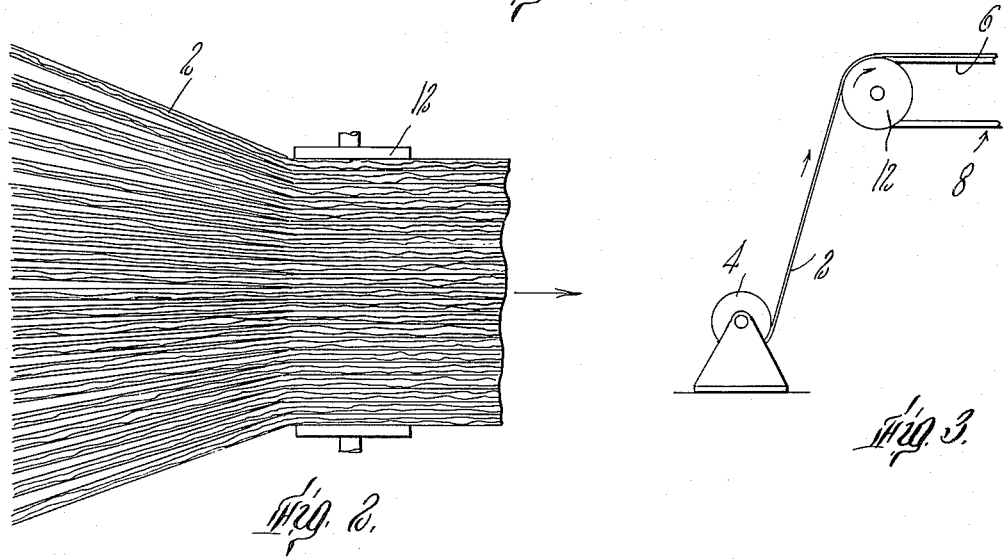
FIG. 2 is a plan view on line 2—2 of FIG. 1.
Figure 3:
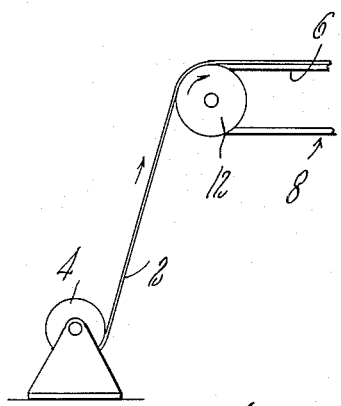
FIG. 3 is similar to the left hand end of FIG. 1 but showing a modification.

As is shown in FIG. 3, the woven or nonwoven backing fabric 14 may be omitted, in which case the assemblage of rovings 2 is drawn from the supply 4 and passed across the upper flight 8 of the apron 10, as shown, through the needling apparatus to be wound up into a roll, as before.

Figure 4:
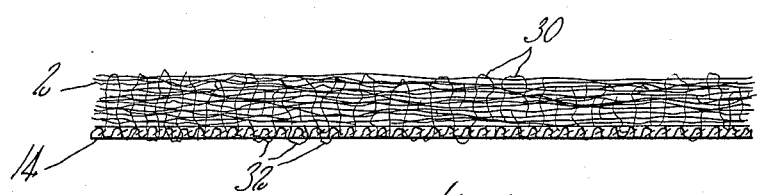
FIG. 4 is a sectional view of the completed mat formed on the apparatus of FIG. 1.
Figure 5:
FIG. 5 is a sectional view of the completed mat formed on the apparatus of FIG. 3.

The resulting product shown schematically in FIGS. 4 and 5 includes a multiplicity of generally longitudinally extending staggered looped rovings 2 composed of glass filaments, and a considerable number of transversely disposed filaments 30, 32. The needling operation causes the shaggy ends of loops of adjoining rovings to be a considerable extent interlaced and felted to provide an end product of extreme uniformity and good strength.

The mats formed in accordance with the invention are relatively less expensive than prior mats, as both the prior chemically bonded and mechanically bonded mats are expensive because they are prepared from strands of glass which are doffed intermittently from the spinner in which the filaments are formed. Cost is further reduced because it is not necessary to carry out the chopping operation which has heretofore been required to reduce the continuous rovings, as supplied by the glass manufacturer, into the short chopped lengths employed in the mats. The mats of the invention have good compressibility so that they do not show resin rich and resin starved areas in parts molded therefrom. The mats of the invention show excellent uniformity of fiber distribution throughout their volume—an attribute difficult or impossible to obtain when employing chopped fibers.

The mats of the invention possess excellent physical properties for use in the reinforcement of plastic molded objects. They are free from adhesive bonds between rovings, and, accordingly, highly drapable and conformable so that when placed in the mold they can readily be shaped about intricate compound curved surfaces and sharp corners.

Molded resinous laminates made from a plurality of plies of the mats of the invention show much greater interply shear strength than laminates made with chemically bonded mats. Laminates made from mats of the invention have much higher tensile strength than laminates made with a comparable quantity of other type mats. The strength in the direction of extent of the rovings is particularly excellent with the result that the molder can now dispense with the use of carriers and conveyors and still saturate the mats with the resin and otherwise process them on continuous process equipment.

We claim:

1. A drapable, conformable and compressible nonwoven glass fiber mat in the form of a sheet suitable for use in reinforcing molded plastic material, comprising a plurality of staggered looped rovings each roving containing a multiplicity of adhesively-joined continuous individual glass fiber filaments, said rovings lying generally side by side, the rovings being held in association with each other solely by filaments of the rovings displaced from the rovings to extend transversely of the sheet and through more than one roving, to form a non-woven glass fiber mat having sufficient coherence and integrity to be self-sustaining when handled.

2. A drapable, conformable and compressible glass fiber mat in the form of a sheet suitable for use in reinforcing molded plastic material, comprising a plurality of staggered looped rovings each roving containing a multiplicity of adhesively-joined continuous individual glass fiber filaments, said rovings lying generally side by side, the rovings being held in association with each other solely by filaments of the rovings displaced from the rovings to extend transversely of the rovings through more than one roving to form a non-woven glass fiber mat having sufficient coherence and integrity to be self-sustaining when handled, and a woven textile fabric disposed against one face of said sheet and united thereto by said transversely extending filaments.

References Cited by the Examiner

UNITED STATES PATENTS

| | | | |
|---|---|---|---|
| 1,400,302 | 12/1921 | Maussner | 161—154 |
| 2,339,431 | 1/1944 | Slayter | 161—79 |
| 2,671,745 | 3/1954 | Slayter | 156—177 |
| 2,794,759 | 6/1957 | Dildilian | 161—154 |
| 2,975,503 | 3/1961 | Bacon et al. | 161—70 |

OTHER REFERENCES

Sonneborn: Fiberglas Reinforced Plastics, Reinhold Pub. Corp., New York, 1954 (pp. 1–2, 18–22, and 27 relied on).

ALEXANDER WYMAN, *Primary Examiner.*

RUSSELL C. MADER, *Examiner.*

H. G. GARNER, G. D. MORRIS, *Assistant Examiners.*